United States Patent
Suzuki (10) Patent No.: US 9,794,442 B2
(45) Date of Patent: Oct. 17, 2017

(54) COMMUNICATION APPARATUS, CONTROL METHOD, AND STORAGE MEDIUM

(71) Applicant: CANON KABUSHIKI KAISHA, Tokyo (JP)

(72) Inventor: Katsuya Suzuki, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/139,226

(22) Filed: Apr. 26, 2016

(65) Prior Publication Data
US 2016/0323476 A1 Nov. 3, 2016

(30) Foreign Application Priority Data
Apr. 30, 2015 (JP) ................. 2015-093504

(51) Int. Cl.
| | |
|---|---|
| G06F 15/00 | (2006.01) |
| H04N 1/23 | (2006.01) |
| H04L 12/931 | (2013.01) |
| H04L 29/08 | (2006.01) |
| H04L 13/18 | (2006.01) |
| H04L 29/14 | (2006.01) |

(52) U.S. Cl.
CPC ......... *H04N 1/2307* (2013.01); *H04L 13/182* (2013.01); *H04L 49/355* (2013.01); *H04L 67/02* (2013.01); *H04L 67/025* (2013.01); *H04L 69/40* (2013.01)

(58) Field of Classification Search
USPC ....................................... 358/1.15
See application file for complete search history.

(56) References Cited

U.S. PATENT DOCUMENTS

2006/0117084 A1* 6/2006 Morozumi ......... H04N 1/00204
709/203
2014/0240782 A1* 8/2014 Terashita .............. G06F 3/1203
358/1.15

FOREIGN PATENT DOCUMENTS

JP 2006-062266 A 3/2006

* cited by examiner

*Primary Examiner* — Saeid Ebrahimi Dehkordy
(74) *Attorney, Agent, or Firm* — Canon U.S.A., Inc. IP Division (57) ABSTRACT

A communication apparatus determines whether to stop data reception during interpretation of the data according to a situation.

20 Claims, 8 Drawing Sheets

COMMUNICATION APPARATUS, CONTROL METHOD, AND STORAGE MEDIUM

BACKGROUND OF THE INVENTION

Field of the Invention

The present invention relates to a communication apparatus including a plurality of communication interfaces, a control method, and a program.

Description of the Related Art

In recent years, communication protocols for devices on networks, mechanisms of device discovery, mechanisms of device installation, and specifications for various services such as printing and scanning are standardized with an increase in network compatible devices. The standardization has been expanded not only in networks but also in universal serial buses (USB). For example, there is USB Print Interface Class Internet printing protocol (IPP) protocol Specification (IPP USB Specification).

Techniques have been known in which host computers transmit print data pieces to printers using networks and USBs.

Japanese Patent Application Laid-Open No. 2006-62266 discusses that a printer and a host computer are connected with each other by a network. Further, it is discussed that if a network state is shifted to an off-line state during when the printer is receiving print data from the host computer, the printer starts to read and discard the print data and clears a reception buffer.

In the technique discussed in Japanese Patent Application Laid-Open No. 2006-62266, data processing when the network state becomes the off-line state is described. The host computer which is a data transmission source can also grasp the network state. Thus, when the network state becomes the off-line state, the host computer can grasp a reason why data cannot be transmitted. Further, the host computer can grasp a reason why a response indicating completion of reception of the print data is not transmitted from the printer. Accordingly, the host computer can appropriately complete data transmission processing.

However, a reception apparatus for receiving data may stop data reception by reason of other than shifting of the network state to the off-line state. For example, when the reception apparatus determines that received data is uninterpretable, the reception apparatus may stop data reception in some cases. In such cases, if the reception apparatus does not transmit a reason why the reception apparatus stops data reception to the host computer, the host computer cannot confirm whether data is appropriately received by the reception apparatus. Thus, there is a possibility that the host computer cannot appropriately complete data transmission processing.

SUMMARY OF THE INVENTION

In order to solve the above-described issue, a communication apparatus according to the present invention includes a first communication unit including a mechanism configured to transmit stop information for stopping communication, a second communication unit not including a mechanism configured to transmit stop information for stopping communication, and a control unit configured to, in a case where data received from a terminal device is uninterpretable by the communication apparatus and the data is received using the first communication unit, stop reception of the data during interpretation of the data, and in a case where data received from a terminal device is uninterpretable by the communication apparatus and the data is received using the second communication unit, receive the data until the end thereof and transmit a response indicating completion of reception to the terminal device.

Further features of the present invention will become apparent from the following description of exemplary embodiments with reference to the attached drawings.

DESCRIPTION OF THE EMBODIMENTS

Various exemplary embodiments of the present invention will be described in detail below with reference to the attached drawings. However, the relative arrangement of the components, display screens, and the like described in the exemplary embodiments should not be construed restrictively limiting the scope of the present invention thereto.

Figure 1:
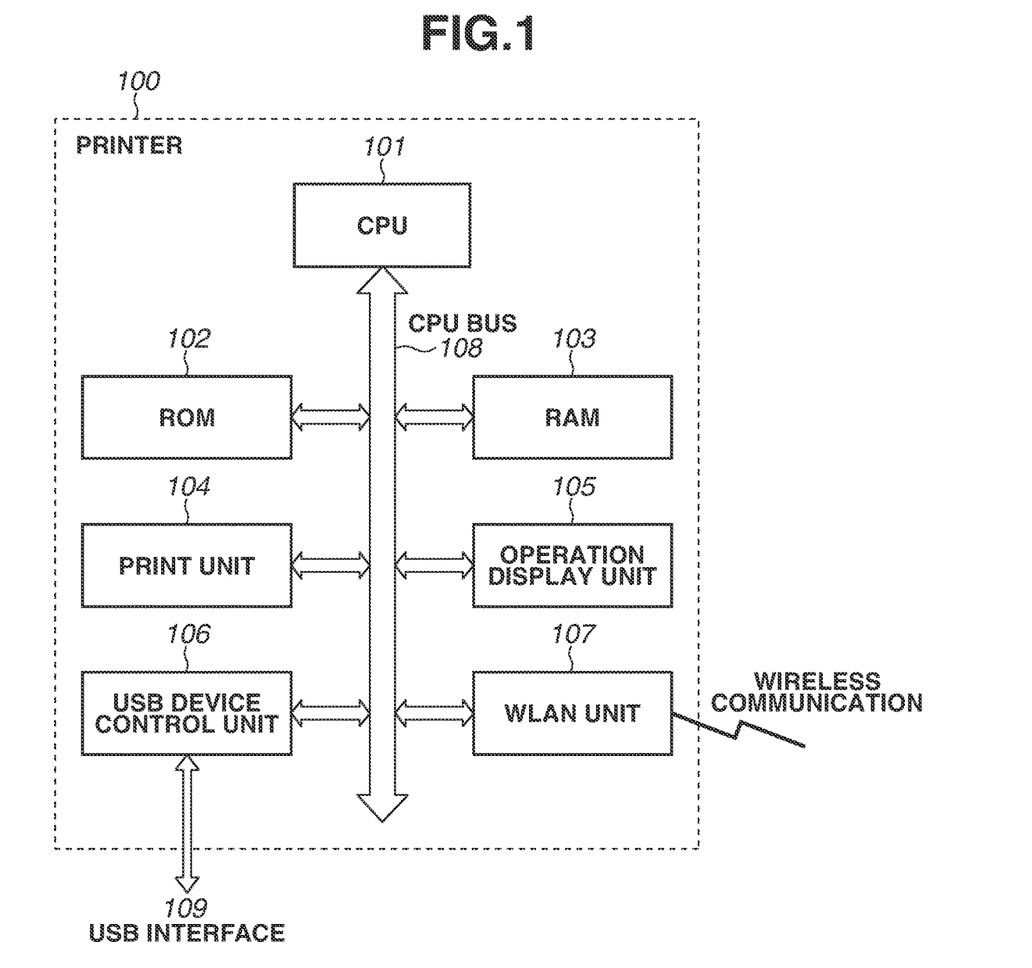
FIG. 1 is a function block diagram illustrating a schematic configuration of a printer 100 according to a first exemplary embodiment of the present invention.

FIG. 1 is a block diagram illustrating a schematic configuration of a printer 100 according to a first exemplary embodiment. In the printer 100, a central processing unit (CPU) 101 is a system control unit and controls the entire printer 100. A read-only memory (ROM) 102 stores a control program and a data table executed by the CPU 101 and fixed data, such as an embedded operating system (OS) program. According to the present exemplary embodiment, software execution control, such as scheduling, task switch, and interrupt processing are performed by each control program stored in the ROM 102 under control of the embedded OS stored in the ROM 102. A random access memory (RAM) 103 temporarily stores a program and image data to perform processing at high speed. The printer according to the present exemplary embodiment may be simply referred to as a communication apparatus since the printer executes data communication processing. In addition, the present exemplary embodiment may be applied not only to a printer but also to a multifunction peripheral having a printing function, a scanning function, and other functions.

A print unit 104 executes print processing for printing an image on a sheet such as a print sheet. An operation display unit 105 includes keys, such as a numerical input key, a mode setting key, a determination key, and a cancel key, light emitting diode (LED), a liquid crystal display (LCD), and others, and a user can perform starting and settings of various functions as the printer from the operation display unit 105. A USB device control unit 106 performs communication control of a USB interface and performs protocol control according to the USB communication standards. The USB device control unit 106 converts data generated by a USB device control task executed by the CPU 101 into a packet and performs USB packet transmission to a PC 200 illustrated in FIG. 2. Reversely, the USB device control unit 106 converts a USB packet transmitted from the PC 200 into data and transmits the data to the CPU 101. Further, the USB device control unit 106 detects connection of the PC 200 thereto via the USB. A wireless local area network (WLAN) unit 107 communicates with a terminal on a network (a network which can perform communication according to Transmission Control Protocol/Internet Protocol (TCP/IP)) by wireless communication. The WLAN unit 107 can perform data (packet) communication with a not-illustrated access point (referred to as an AP in below) and the PC 200 in a WLAN system compliant with, for example, Institute of Electrical and Electronics Engineers (IEEE) 802.11 series. The above-described components 101 to 107 are connected with each other via a CPU bus 108 managed by the CPU 101. The printer 100 in FIG. 1 may include a wired LAN unit.

Figure 2:
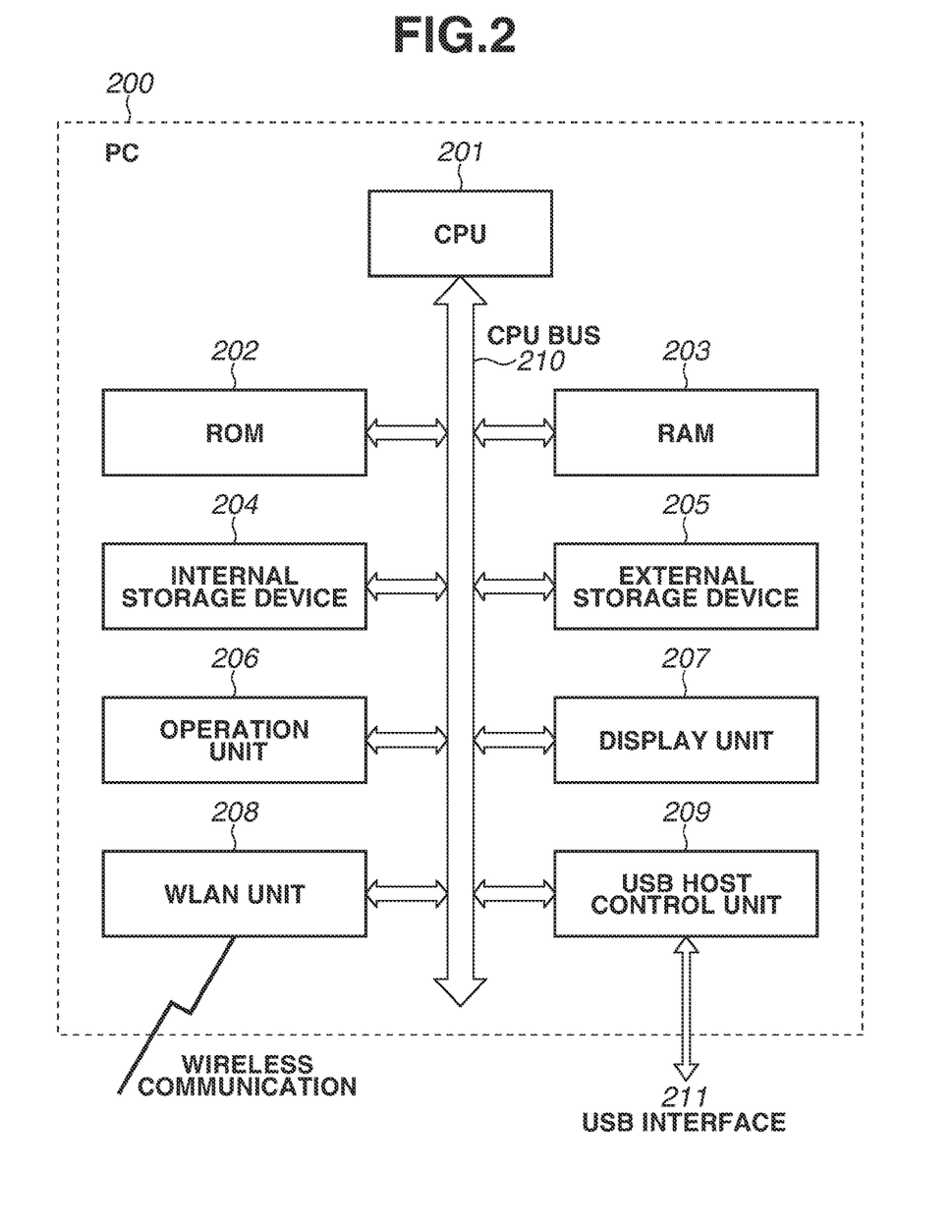
FIG. 2 is a function block diagram illustrating a schematic configuration of a personal computer (PC) 200 according to the first and a second exemplary embodiments of the present invention.

FIG. 2 is a block diagram illustrating a schematic configuration of the PC 200 according to the present exemplary embodiment. A CPU 201 controls operations of the entire PC 200 via a system bus according to a program read from a ROM 202, a RAM 203, an internal storage device 204, or an external storage medium by an external storage device 205. The ROM 202 stores a control program of the CPU 201 and the like. The RAM 203 temporarily stores a program and image data and is used as a work memory of the CPU 201. The internal storage device 204 stores an operating system and the like. An operation unit 206 controls a keyboard and a mouse (not illustrated) as user instruction input units. A display unit 207 performs various types of display to a user. A WLAN unit 208 performs communication between the not-illustrated AP and the printer 100 by wireless communication. Since the description is similar to that of the WLAN unit 107, the detail description is omitted here. A USB host control unit 209 has a function as a host in the USB communication and performs communication between the printer 100. The above-described components 201 to 209 are connected with each other via a CPU bus 210 managed by the CPU 201.

Figure 3:
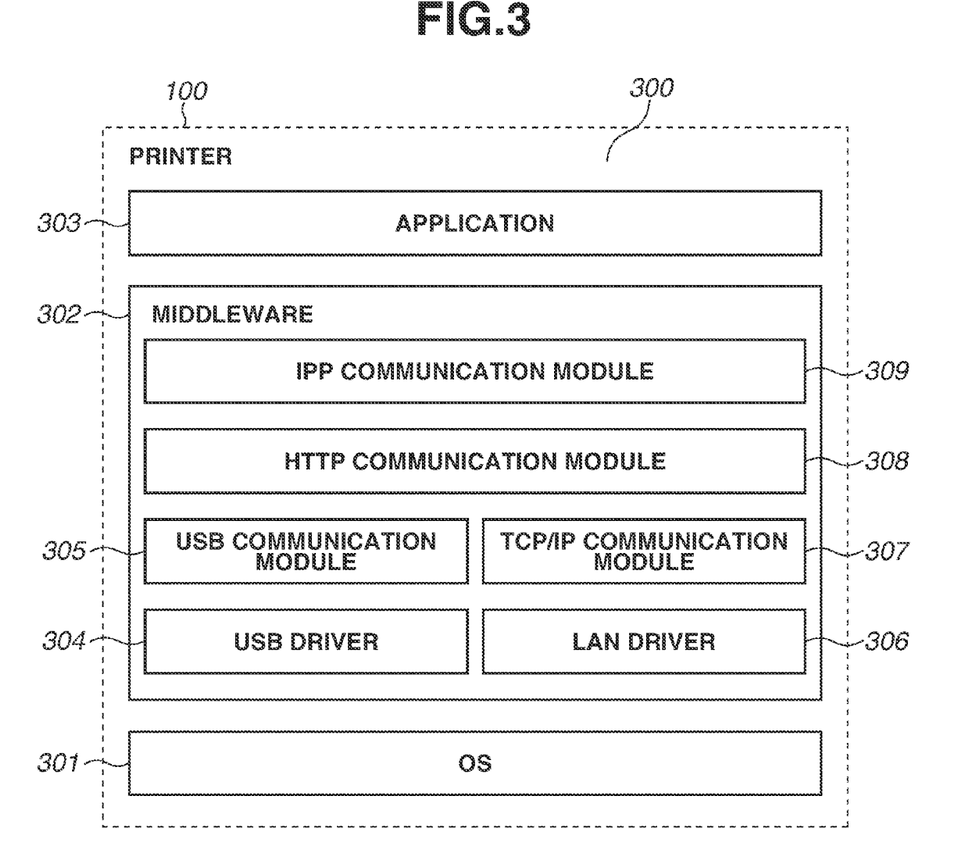
FIG. 3 is a block diagram illustrating software (S/W) of the printer 100 according to the first and the second exemplary embodiments of the present invention.

FIG. 3 illustrates a block 300 which is a schematic configuration of software (S/W) of the printer 100 according to the present exemplary embodiment. As illustrated in FIG. 3, the printer 100 is configured so that each software module operates on an operating system (OS) 301. On the OS 301, a middleware layer 302 handling network communication exists, and an application 303 operating using data transmission and reception of the network exists on a further upper layer.

On a lowest layer of the middleware layer 302, a USB driver 304 and a LAN driver 306 for respectively controlling the USB device control unit 106 and the WLAN unit 107 exist. On an upper layer of the lowest layer, a USB communication module 305 for performing basic USB communication control and a TCP/IP communication module 307 for performing basic network communication control exist. The components 304 to 307 depend on hardware (H/W), and the USB driver 304 and the USB communication module 305 perform communication in the case of communication via the USB, and the LAN driver 306 and the TCP/IP communication module 307 perform communication in the case of communication via the network. On a further upper layer, a hypertext transfer protocol (HTTP) communication module 308 and an Internet printing protocol (IPP) communication module 309 which are independent of the H/W exist across the USB communication module 305 and the TCP/IP communication module 307. The HTTP communication module 308 and the IPP communication module 309 realize communication of an application without being conscious of the lower layers. The HTTP communication module 308 executes communication using an HTTP protocol, and the IPP communication module 309 executes communication using an IPP protocol.

A communication module of a protocol realizing application communication is not particularly limited to the HTTP communication module 308 and the IPP communication module 309.

The printer 100 and the PC 200 can perform communication by the HTTP protocol via the network or the USB and transmit and receive image data (or print data) to and from each other. The HTTP communication conforms to the TCP/IP specification for the Internet and the LAN in the case of communication via the network and conforms to the IPP over USB specification (Version 1.0) in the case of communication via the USB.

Figure 4:
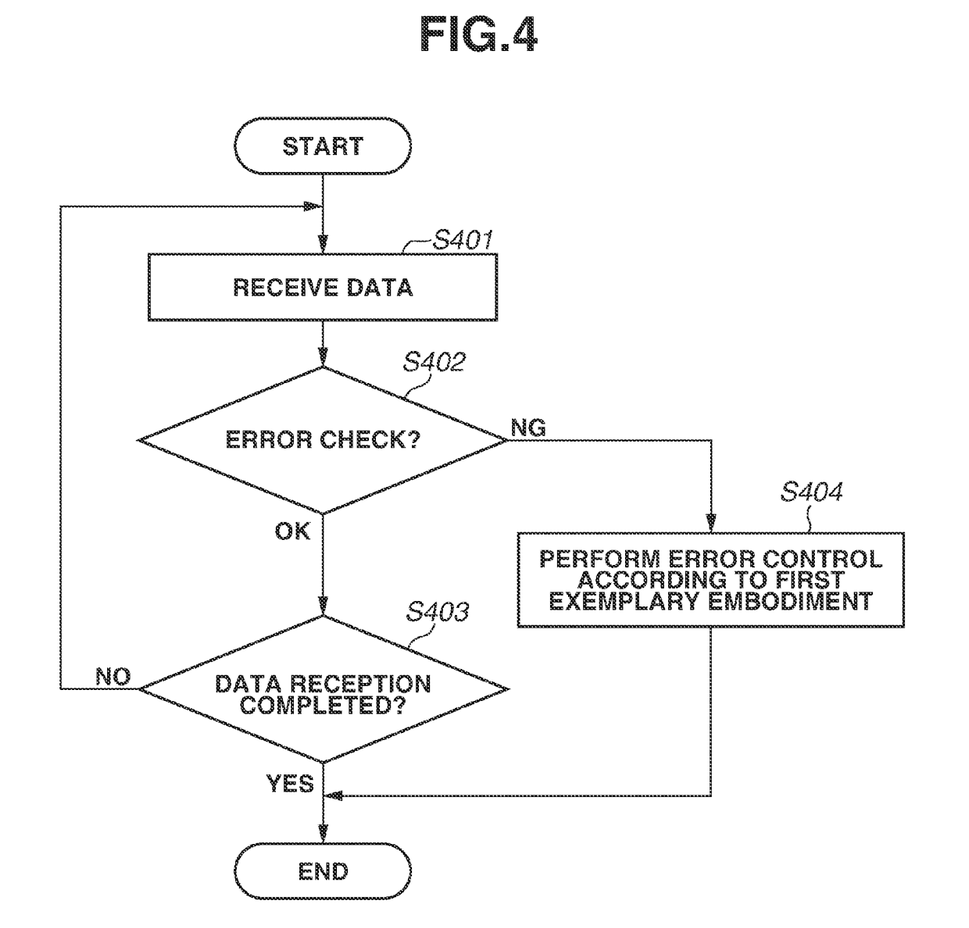
FIG. 4 is a flowchart illustrating data reception by the printer 100 according to the first exemplary embodiment of the present invention.

FIG. 4 is a flowchart illustrating that the printer 100 receives http data from the PC 200 by the HTTP communication. Processing described in the flowchart according to the present exemplary embodiment is realized by the CPU 101 reading and executing a program regarding the flowchart. The http data transmitted and received according to the present exemplary embodiment includes a header portion and a body portion. In the header portion, size information regarding the data and the like are described. In the body portion, data regarding a text and an image printed on a sheet is included.

In step S401, the CPU 101 receives data having an arbitrary size and, in step S402, performs error check. In the error check (in step S402), the CPU 101 determines whether an error occurs during data reception. More specifically, when the data received in step S401 is determined as uninterpretable data, the CPU 101 determines that an error occurs. Further, when the received data does not include a command indicating an end of the data, the CPU 101 determines that an error occurs (NG in step S402). In addition, the CPU 101 confirms whether a power off operation is performed by the operation display unit 105 during the data reception, and if it is determined that the power off operation is performed, the CPU 101 determines that an error occurs (NG in step S402). According to the present exemplary embodiment, power off means that power supply is interrupted at least to the print unit 104, the USB device control unit 106, and the WLAN unit 107 of the printer 100. The power off operation is an operation for changing a power source state of the printer 100 to off.

In step S402, when it is determined that an error occurs (NG in step S402), in step S404, the CPU 101 executes error control processing and terminates the processing in the flowchart. Details of the processing in step S404 are described below with reference to FIG. 5. On the other hand, in step S402, when it is determined that an error does not occur (OK in step S402), the processing in FIG. 4 proceeds to step S403. The CPU 101 determines whether the data received in step S403 indicates the end of the data. When the CPU 101 determines that the data indicates the end of the data (YES in step S403), the processing in the flowchart in FIG. 4 is terminated, whereas if it is not the end of the data (NO in step S403) the processing returns again to step S401. The CPU 101 repeats the processing from step S401 to step S403 until it is determined as YES in step S403.

Figure 5:
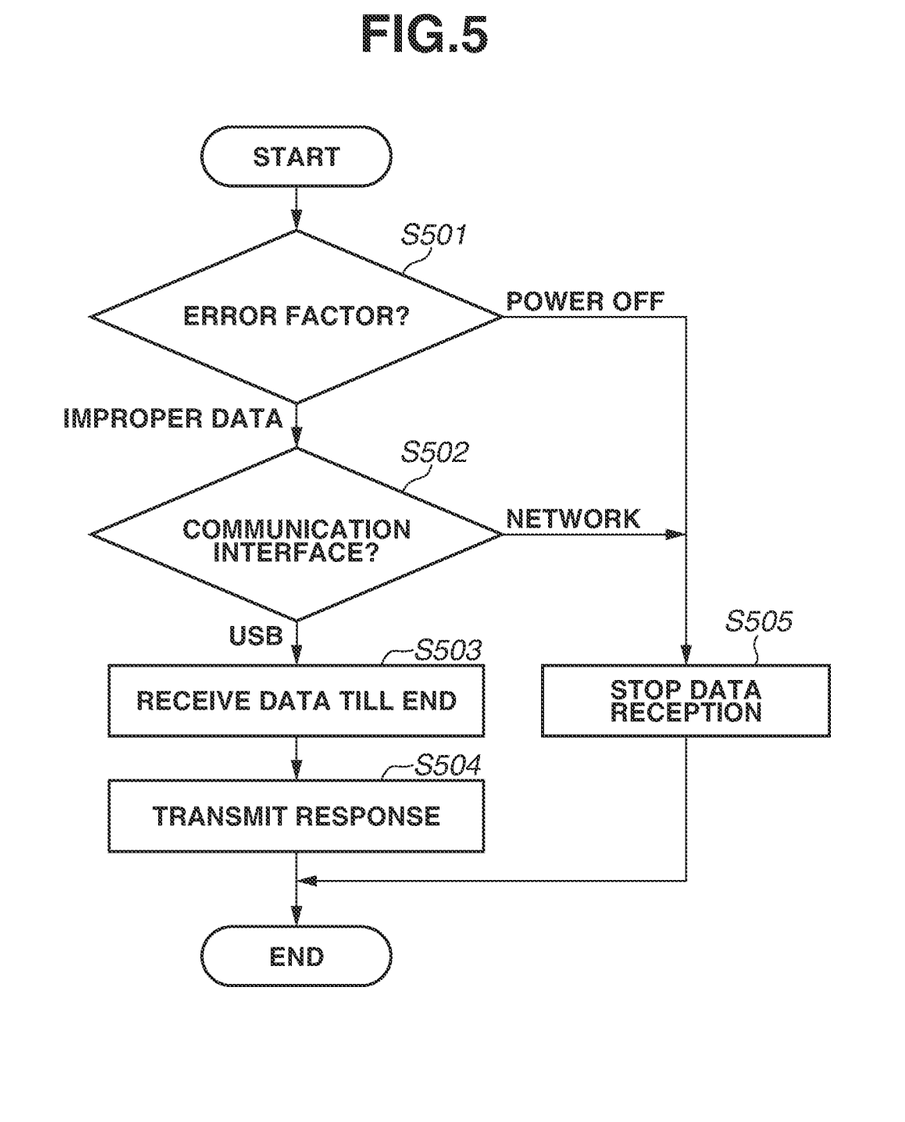
FIG. 5 is a flowchart illustrating error control by the printer 100 according to the first exemplary embodiment of the present invention.

FIG. 5 is a flowchart for describing the error control processing (in step S404) in FIG. 4 in detail. When the CPU 101 determines that the error check in step S402 is NG in the middle of data reception from the PC 200, the processing in the flowchart in FIG. 5 is started.

In step S501, the CPU 101 determines an error factor. It is because whether to execute determination processing (in step S502) or not is determined by the error factor. In this regard, it is described below that a reason why the processing in step S503 is required in the case where the error factor is reception of data uninterpretable by the printer 100 and not required in the case where the error factor is the power off.

(1) In the Case where the Printer 100 Receives Uninterpretable Data

In step S502, the CPU 101 confirms the communication interface used when the data is received. For example, when the data is received via the USB device control unit 106, the CPU 101 can confirm that the USB is used as the communication interface. On the other hand, when the data is received via the WLAN unit 107, the CPU 101 can confirm that the network is used as the communication interface.

When it is determined that the data is received using the network (NETWORK in step S502), in step S505, the CPU 101 stops the data reception. At that time, the CPU 101 disconnects the communication with the PC 200.

On the other hand, when it is determined that the data is received using the USB (USB in step S502), in step S503, the CPU 101 continues the data reception until the end of the data. When the data is received until the end, in step S504, the CPU 101 transmits a response to the PC 200. The response in step S504 indicates completion of the data reception. Accordingly, the PC 200 can recognize that the data is received by the printer 100.

The reason to switch processing according to the difference of the communication interfaces is described below.

When the CPU 101 recognizes occurrence of error (reception of data uninterpretable by the printer 100) during data reception via the network, the CPU 101 immediately stops the data reception and disconnects the communication only in the TCP/IP layer in communication by transmitting a FIN packet and the like. Accordingly, the communication with the PC 200 can be easily terminated, and the PC 200 (more specifically, a printer driver) does not need to perform unnecessary communication after the error occurrence. In addition, the CPU 201 can grasp a reason to stop data transmission in the middle by the FIN packet and thus can appropriately stop the printer driver or an application instructed to print. A FIN packet is used when communication is terminated in TCP/IP and can be also referred to as stop information for stopping communication.

On the other hand, when the CPU 101 recognizes occurrence of error during data reception via the USB, the CPU 101 can stop the data reception but cannot transmit a FIN packet of TCP/IP as in the case of the network communication. In other words, the network communication using the TCP/IP is provided with a mechanism for transmitting stop information (a FIN packet) for stopping communication, and the USB communication is not provided with a mechanism for transmitting stop information (a FIN packet) for stopping communication. Therefore, if the printer 100 unilaterally stops data reception and terminates communication, the CPU 201 of the PC 200 cannot detect that the data reception is stopped in the printer 100 as long as the PC 200 is connected to the printer 100 by the USB. Accordingly, the CPU 201 of the PC 200 continues the data transmission. However, if the data transmission is continued and completed, no response is transmitted from the printer 100, so that the CPU 201 of the PC 200 cannot recognize whether the data is normally received by the printer. Accordingly, the CPU 201 of the PC 200 cannot stop (normally terminate) the printer driver or the application instructed to print. Subsequently, the CPU 201 will forcibly terminate the printer driver or the application instructed to print after a predetermined time elapsed from the completion of the data transmission. It is better not to perform the forcible termination as much as possible. In order to avoid such forcible termination, in step S503, the CPU 101 receives data until the end even if the CPU 101 recognizes occurrence of error during data reception via the USB, and, in step S504, transmits a response to the PC 200. Accordingly, the CPU 201 of the PC 200 can recognize that the data is normally received by the printer and stop (normally terminate) the printer driver or the application instructed to print. In this regard, the CPU 101 receives data determined as uninterpretable by the printer 100 until the end of data in step S503, however, the CPU 101 reads and discards (deletes) the received data before or after the processing in step S504.

(2) In the Case where Power Off Operation is Performed During Data Reception (or Data Interpretation)

If a power off operation is executed during data reception, power supply to the USB device control unit 106 and the WLAN unit 107 is interrupted. Therefore, communication is physically impossible, and, in step S505, the CPU 101 stops the data reception regardless of the communication interface. According to the processing in step S505, the PC 200 and the printer 100 do not have to perform unnecessary communication. Subsequently, the CPU 101 executes the power off operation after the processing in step S505 and interrupts the power supply to the USB device control unit 106 and the WLAN unit 107.

The reason to execute the processing in step S505 when the power off operation is performed is described. In more detail, the reason why determination processing in step S502 becomes unnecessary is described.

In the communication via the network, the CPU 101 transmits the FIN packet or the like after stopping the data reception to disconnect the communication in the TCP/IP layer and thus can terminate the communication with the PC 200.

On the other hand, in the communication via the USB, the communication is continued as long as the USB connection is established between the PC 200 and the printer 100 after stopping the data reception. Thus, data is not received during a period from when the CPU 101 stops data reception to when the power of the printer 100 is turned off, but the communication between the PC 200 and the printer 100 remains continued. However, if the power is turned off, the USB is disconnected in the manner of the H/W, and the communication is terminated. In the case of disconnection of the H/W, the PC 200 is more likely to be able to detect the termination of communication.

Thus, regardless of whether the communication between the PC 200 and the printer 100 is executed by the network connection or the USB connection, the CPU 201 of the PC 200 can recognize the stop of communication when the power of the printer 100 is shifted to an off state. Accordingly, the CPU 201 of the PC 200 can stop (normally terminate) the printer driver or the application instructed to print.

As described above, when the power off operation is performed during data reception, the CPU 201 of the PC 200 can appropriately stop (normally terminate) the printer driver or the application instructed to print if the CPU 101 does not transmit a response. Thus, only the processing in step S505 is performed.

According to the present exemplary embodiment, the processing in FIG. 5 (especially, the processing in step S502 to step S505 from the network and the processing in step S501 to step S505 from the power off) is performed, and thus the PC 200 can be prevented from transmitting needless data. Further, the processing in FIG. 5 (especially, the processing in step S502 to step S504 from the USB) is performed, and thus the PC 200 can appropriately complete the data transmission processing.

According to the first exemplary embodiment, the control method is described in which data reception is stopped regardless of the communication interfaces when the power off operation is performed by the printer 100 during the data reception. However, there are printers with an automatic power on function in recent years. The automatic power on function is described herein. A printer in which the automatic power on function is enabled is automatically (without receiving a power on operation of the printer from a user) shifted from a power off state to a power on state when the printer receives an operation request, such as printing, from a terminal device, such as a PC and a tablet, in the power off state. Thus, even the power of the printer is in the off state, but if the automatic power on function is enabled, the power supply is maintained to the communication units such as the USB device control unit 106 and the WLAN unit 107. Accordingly, the H/W of the USB is not disconnected in the power off state, and the communication control means described according to the first exemplary embodiment is not effective. Especially, when it is determined that the power is off in step S501, the processing executing only step S505 is not effective. The reason thereof will be described below.

According to a second exemplary embodiment, processing specific to the second exemplary embodiment is described, and parts similar to those according to the first exemplary embodiment may be omitted in some cases.

Figure 6:
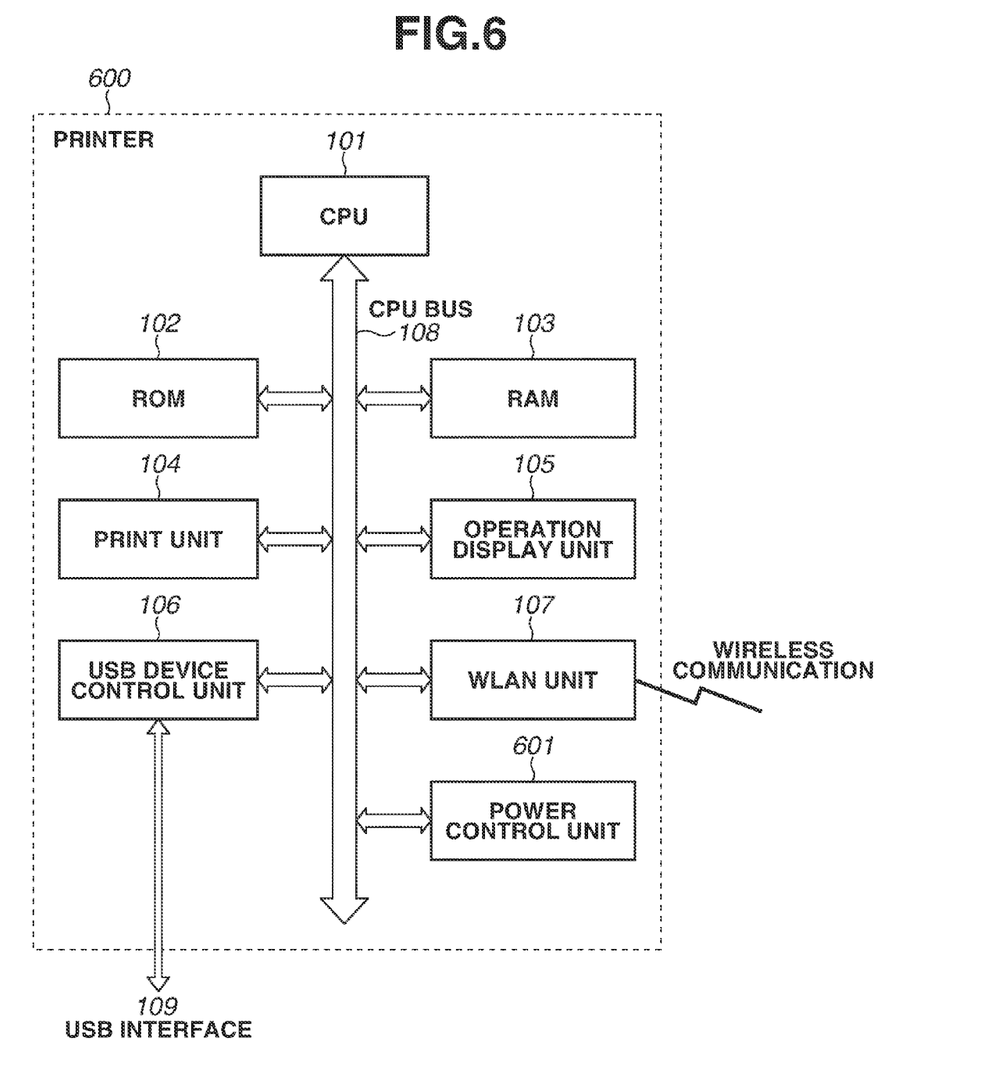
FIG. 6 is a function block diagram illustrating a schematic configuration of a printer 600 according to the second exemplary embodiment of the present invention.

FIG. 6 illustrates a printer 600 according to the present exemplary embodiment. The printer 600 includes a power control unit 601 configured to control the power in the power off state in addition to the apparatus configuration similar to that of the printer 100 and has the automatic power on function. When the automatic power on setting is enabled, the power is supplied to the communication units such as the USB device control unit 106 and the WLAN unit 107 so as to be able to communicate with an external terminal device in the power off state. On the other hand, when the automatic power on setting is disabled, the power is not supplied to the communication units such as the USB device control unit 106 and the WLAN unit 107 in the power off state, and the USB and the network are in a disconnected state. As with the printer 100, the printer 600 can connect to and communicate with the PC 200 via the USB device control unit 106 or the WLAN unit 107.

Figure 7:
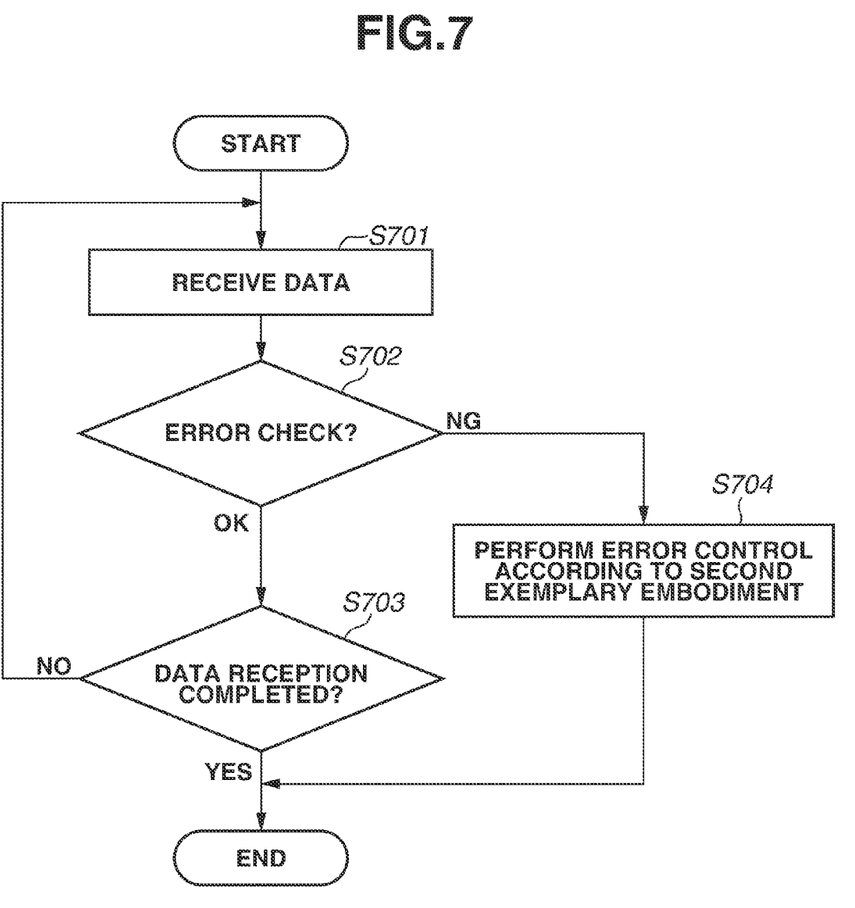
FIG. 7 is a flowchart illustrating data reception by the printer 600 according to the second exemplary embodiment of the present invention.

FIG. 7 is a flowchart illustrating processing executed when the printer 600 receives http data from the PC 200 by HTTP communication.

The processing in steps S701 to S703 is the same processing as that in steps S401 to S403 in FIG. 4, and thus detailed description thereof is omitted. In step S702, if it is determined as error (NG in step S702), in step S704, the CPU 101 executes error control according to the second exemplary embodiment and terminates the processing in the flowchart.

Figure 8:
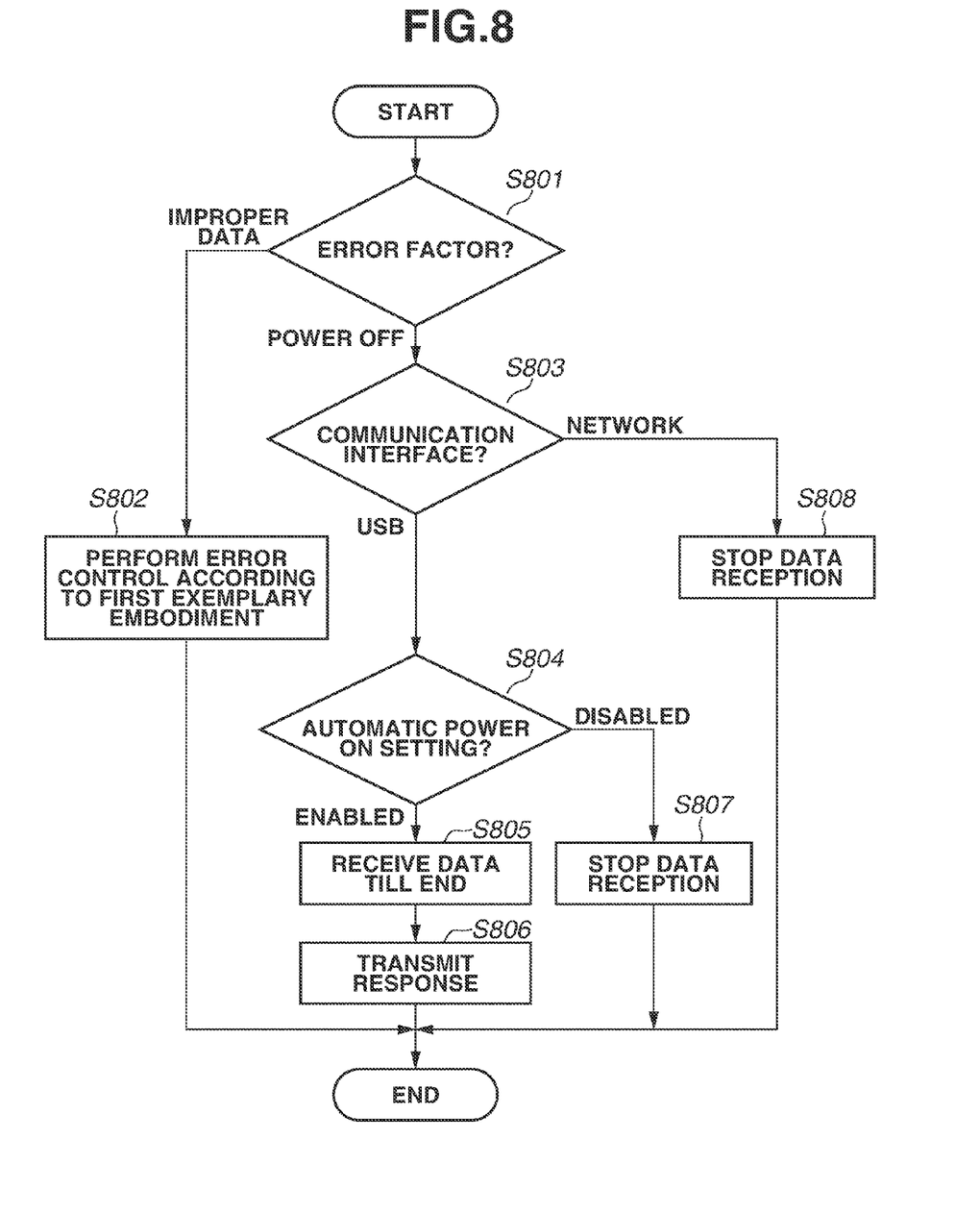
FIG. 8 is a flowchart illustrating error control by the printer 600 according to the second exemplary embodiment of the present invention.

FIG. 8 is a flowchart illustrating in detail the error control (step S704) according to the second exemplary embodiment in FIG. 7. The processing in this flowchart is started when the error check in step S702 is determined as NG during when the CPU 101 is receiving data from the PC 200.

First, in step S801, the CPU 101 determines an error factor. The reason to determine the error factor is similar to that according to the first exemplary embodiment.

(1) In the Case where the Printer 600 Receives Uninterpretable Data

In step S801, when the CPU 101 determines that the error factor is reception of data uninterpretable by the printer 600 (IMPROPER DATA in step S801), the processing in steps S502 to S505 according to the first exemplary embodiment is executed. In the case where the printer 600 receives the uninterpretable data, it is not affected by the automatic power on setting, so that the processing in steps S502 to S505 according to the first exemplary embodiment is executed.

(2) In the Case where Power Off Operation is Performed During Data Reception

In step S801, when the CPU 101 determines that the error factor is the power off (POWER OFF in step S801), in step S803, the CPU 101 confirms the communication interface used in the data reception.

If it is determined that the data is received using the network (NETWORK in step S803), in step S808, the CPU 101 stops the data reception. At that time, the CPU 101 disconnects communication with the PC 200.

On the other hand, if it is determined that the data is received using the USB (USB in step S803), in step S804, the CPU 101 further confirms whether the automatic power on setting is enabled or disabled. If it is determined that the automatic power on setting is enabled (ENABLED in step S804), in step S805, the CPU 101 continues the data reception until the end of the data. When the data is received until the end, in step S806, the CPU 101 transmits a response to the PC 200. The response in step S806 also indicates completion of the data reception.

On the other hand, in step S804, if it is determined that the automatic power on setting is disabled (DISABLED in step S804), in step S807, the CPU 101 stops the data reception.

The reason to switch processing according to contents of the automatic power on setting is described below.

When the automatic power on setting is enabled, the power is turned off while the power remains to be supplied to the USB device control unit 106. Therefore, a connection state between the PC 200 and the printer 600 "remains connected". Thus, similar to the reason of the error control of the USB described in steps S503 and S504 according to the first exemplary embodiment, the CPU 101 needs to receive data until the end in step S805 and transmits a response in step S806. For example, it is assumed that when print data for executing printing of first to tenth pages is received and the power off is instructed during printing of a fifth page, the CPU 101 stops printing and data reception of a sixth and subsequent pages. As described above, when data communication is performed by the USB connection, the CPU 101 does not transmit a response only for stop of the data reception. In addition, when the automatic power on setting is enabled, the power is continuously supplied to the USB device control unit 106. Accordingly, if the data transmission is continued and completed, no response is transmitted from the printer 600, so that the CPU 201 of the PC 200 cannot recognize whether the data is normally received by the printer. In addition, the connection state of the USB communication "remains connected", the CPU 201 of the PC 200 cannot grasp a reason why the response is not returned. Accordingly, the CPU 201 of the PC 200 cannot stop (normally terminate) the printer driver or the application instructed to print. The CPU 101 receives the data until the end in step S805 and transmits the response in step S806, and accordingly, the CPU 201 of the PC 200 can stop (normally terminate) the printer driver or the application instructed to print.

On the other hand, when the automatic power on setting is disabled, the power is not supplied to the USB device control unit 106, and at the time, the USB communication is physically in a "disconnected state". This processing is similar to the flow shifting from step S501 to step S505 according to the first exemplary embodiment. Therefore, the CPU 101 stops data reception in step S807.

As described above, when any error occurs during data reception, the communication control is switched in response to the error factor, the type of the communication interface, and the state of the apparatus, so that a load on a terminal device which is a communication partner of the own apparatus can be reduced as much as possible, and the communication can be efficiently terminated.

According to the aspects of the present invention, a terminal device as a data transmission source can appropriately complete data transmission processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-093504, filed Apr. 30, 2015, which is hereby incorporated by reference herein in its entirety.

What is claimed is:

1. A communication apparatus comprising:
    a first communication unit capable of transmitting stop information in a case where communication is stopped;
    a second communication unit not capable of transmitting stop information in a case where communication is stopped; and
    a determination unit configured to determine, in a case where data received from a terminal device is uninterpretable by the communication apparatus, whether to stop reception of the data before the reception of the data is completed or receive the data until the end thereof, based on a communication unit used to receive the data,
    wherein, in a case where the uninterpretable data is received using the first communication unit, the determination unit determines to stop reception of the data before the reception of the data is completed, and the stop information is transmitted according to the reception of the data having been stopped,
    wherein, in a case where uninterpretable data is received using the second communication unit, the determination unit determines to receive the data until the end thereof, and a response indicating completion of reception is transmitted to the terminal device according to the reception of the data having been completed, and
    wherein the first communication unit, the second communication unit and the determination unit are implemented by a processor.

2. The communication apparatus according to claim 1, wherein, in a case where an instruction to change a power source state of the communication apparatus to off is input during when data transmitted from the terminal device is being received, the determination unit determines that reception of the data is stopped during interpretation of the data.

3. The communication apparatus according to claim 1, further comprising a first determination unit configured to, in a case where an instruction to change a power source state of the communication apparatus to off is input during when data transmitted from the terminal device is being received, determine whether the first communication unit or the second communication unit is used in reception of the data; and
    a second determination unit configured to, in a case where it is determined that the second communication unit is used, determine whether an automatic power on function is enabled, wherein the automatic power on function automatically changes the power source state to an on state if data is received when the power source state is an off state, and
    wherein, in a case where it is determined that the automatic power on function is enabled, the data is received until the end thereof and a response indicating completion of the reception is transmitted to the terminal device, and in a case where it is determined that the automatic power on function is disabled, reception of the data is stopped during interpretation of the data.

4. The communication apparatus according to claim 1, wherein the first communication unit executes communication of data via a network, and
    the second communication unit executes communication of data via a universal serial bus (USB).

5. The communication apparatus according to claim 1, wherein communication using the first and the second communication units is executed using a hypertext transfer protocol (HTTP) protocol or an Internet printing protocol (IPP) protocol.

6. The communication apparatus according to claim 1, wherein the data is print data, and
the communication apparatus further comprising a print unit configured to execute print processing based on the print data.

7. The communication apparatus according to claim 1, wherein the stop information is a FIN packet.

8. The communication apparatus according to claim 1, the determination unit, in a case where the data received from the terminal device is uninterpretable by the communication apparatus, determines whether the first communication unit or the second communication unit is used in reception of the data.

9. The communication apparatus according to claim 1, wherein the first communication unit executes network communication using Transmission Control Protocol/Internet Protocol (TCP/IP).

10. The communication apparatus according to claim 1, further comprising a deletion unit configured to delete, in a case where the determination unit determines to receive the data until the end thereof, the data after the data is received until the end thereof.

11. A method for controlling a communication apparatus including a first communication unit capable of transmitting stop information in a case where communication is stopped and a second communication unit not capable of transmitting stop information in a case where communication is stopped, the first communication unit and the second communication unit being implemented by a processor, the method comprising:
in a case where data received from a terminal device is uninterpretable by the communication apparatus and the data is received using the first communication unit, stopping reception of the data before the reception of the data is completed, and transmitting the stop information according to the reception of the data having been stopped; and
in a case where data received from a terminal device is uninterpretable by the communication apparatus and the data is received using the second communication unit, receiving the data until the end thereof and transmitting a response indicating completion of reception to the terminal device.

12. The method according to claim 11, further comprising, in a case where an instruction to change a power source state of the communication apparatus to off is input during when data transmitted from the terminal device is being received, stopping reception of the data during interpretation of the data.

13. The method according to claim 11, further comprising, in a case where an instruction to change a power source state of the communication apparatus to off is input during when data transmitted from the terminal device is being received, determining whether the first communication unit or the second communication unit is used in reception of the data;
in a case where it is determined that the second communication unit is used, determining whether an automatic power on function is enabled, wherein the automatic power on function automatically changes the power source state to an on state if data is received when the power source state is an off state;
in a case where it is determined that the automatic power on function is enabled, receiving the data until the end thereof and transmitting a response indicating completion of the reception to the terminal device; and in a case where it is determined that the automatic power on function is disabled, stopping reception of the data during interpretation of the data.

14. The method according to claim 11, wherein the first communication unit executes communication of data via a network, and
the second communication unit executes communication of data via a USB.

15. The method according to claim 11, wherein communication using the first and the second communication units is executed using a HTTP protocol or an IPP protocol.

16. The method according to claim 11, wherein the stop information is a FIN packet.

17. The method according to claim 11, further comprising determining, in a case where the data received from the terminal device is uninterpretable by the communication apparatus, whether the first communication unit or the second communication unit is used in reception of the data.

18. The method according to claim 11, wherein the first communication unit executes network communication using Transmission Control Protocol/Internet Protocol (TCP/IP).

19. The method according to claim 11, further comprising, in a case where data received from a terminal device is uninterpretable by the communication apparatus and the data is received using the second communication unit, deleting the data after the data is received until the end thereof.

20. A non-transitory computer-readable storage medium storing instructions that, when executed by a computer of a communication apparatus including a first communication unit capable of transmitting stop information in a case where communication is stopped and a second communication unit not capable of transmitting stop information in a case where communication is stopped, cause the computer to perform a method comprising:
in a case where data received from a terminal device is uninterpretable by the communication apparatus and the data is received using the first communication unit, stopping reception of the data before the reception of the data is completed, and transmitting the stop information according to the reception of the data having been stopped; and
in a case where data received from a terminal device is uninterpretable by the communication apparatus and the data is received using the second communication unit, receiving the data until the end thereof and transmitting a response indicating completion of reception to the terminal device.

* * * * *